US012105299B2

(12) United States Patent
Menon et al.

(10) Patent No.: US 12,105,299 B2
(45) Date of Patent: Oct. 1, 2024

(54) BROADBAND DIFFRACTIVE OPTICAL ELEMENT

(71) Applicant: University of Utah Research Foundation, Salt Lake City, UT (US)

(72) Inventors: Rajesh Menon, Salt Lake City, UT (US); Apratim Majumder, Salt Lake City, UT (US); Monjurul Feeroz Meem, salt lake city, UT (US)

(73) Assignee: University of Utah Research Foundation, Salt Lake City, UT (US)

( * ) Notice: Subject to any disclaimer, the term of this patent is extended or adjusted under 35 U.S.C. 154(b) by 476 days.

(21) Appl. No.: 17/391,309

(22) Filed: Aug. 2, 2021

(65) Prior Publication Data

US 2023/0127827 A1    Apr. 27, 2023

Related U.S. Application Data

(60) Provisional application No. 63/059,335, filed on Jul. 31, 2020.

(51) Int. Cl.
*G02B 27/42* (2006.01)
*G02B 27/00* (2006.01)

(52) U.S. Cl.
CPC ..... *G02B 27/4205* (2013.01); *G02B 27/0012* (2013.01)

(58) Field of Classification Search
CPC .......... G02B 27/4205; G02B 27/0012
See application file for complete search history.

(56) References Cited

U.S. PATENT DOCUMENTS

| | | | |
|---|---|---|---|
| 6,960,773 B2 | 11/2005 | Menon et al. | |
| 8,049,963 B2 | 11/2011 | Menon et al. | |
| 2006/0050391 A1 | 3/2006 | Blacklund et al. | |
| 2006/0082882 A1 | 4/2006 | Wang et al. | |
| 2015/0248006 A1 | 9/2015 | Schowengerdt | |
| 2016/0219228 A1* | 7/2016 | Kintz | G02B 13/14 |
| 2017/0371133 A1* | 12/2017 | Lai | G02B 13/006 |
| 2018/0052050 A1 | 2/2018 | Menon et al. | |

(Continued)

FOREIGN PATENT DOCUMENTS

| | | | | |
|---|---|---|---|---|
| WO | WO-0231467 A1 * | 4/2002 | | C07K 1/047 |
| WO | WO-2020243828 A1 * | 12/2020 | | G02B 27/0075 |

OTHER PUBLICATIONS

Stuerwald, S. (2018). Theory. In: Digital Holographic Methods. Springer Series in Optical Sciences, vol. 221. Springer, Cham. https://doi.org/10.1007/978-3-030-00169-8_2 (Published Oct. 13, 2018) (Year: 2018).*

(Continued)

*Primary Examiner* — Uzma Alam
*Assistant Examiner* — Chad Andrew Reverman
(74) *Attorney, Agent, or Firm* — Thorpe North & Western, LLP

(57) ABSTRACT

A Broadband Diffractive-Optical Element (BDOE) as a lens whose f-number and numerical aperture are decoupled. The BDOE can include a substrate and an array of optical cells formed on the substrate to have a non-linear arrangement of cell heights to diffract light into a focal spot. The geometry of the focal spot can be designed to decouple the f-number from the numerical aperture for an imaging device that employs the broadband diffractive optical element as a lens.

21 Claims, 9 Drawing Sheets

(56) References Cited

U.S. PATENT DOCUMENTS

| | | | |
|---|---|---|---|
| 2018/0157058 A1 | 6/2018 | Chou et al. | |
| 2018/0231700 A1* | 8/2018 | Ahmed | G02B 5/1814 |
| 2020/0264343 A1* | 8/2020 | Han | G02B 1/14 |
| 2021/0014394 A1* | 1/2021 | Han | G02B 5/288 |
| 2021/0033769 A1 | 2/2021 | Menon | |
| 2021/0037219 A1 | 2/2021 | Colburn et al. | |
| 2021/0247549 A1* | 8/2021 | Park | G02B 1/002 |
| 2022/0357484 A1* | 11/2022 | Hu | G02B 27/0012 |
| 2023/0127827 A1* | 4/2023 | Menon | G02B 27/0012 356/225 |

OTHER PUBLICATIONS

"Large Area Metalenses: Design, Characterization, and Mass Manufacturing," She, et. al., 2018 (Year: 2018).*

"Continuous manipulation of doughnut focal spot in a large scale," Hao, et. al., 2012 (Year: 2012).*

Chen, W.T., Zhu, A.Y., Sanjeev, V. et al. A broadband achromatic metalens for focusing and imaging in the visible. Nature Nanotech 13, 220-226 (2018). https://doi.org/10.1038/s41565-017-0034-6 (published Jan. 1, 2018) (Year: 2018).*

Wang, S., Wu, P.C., Su, VC. et al. A broadband achromatic metalens in the visible. Nature Nanotech 13, 227-232 (2018). https://doi.org/10.1038/s41565-017-0052-4 (Published Jan. 28, 2018) (Year: 2018).*

Banerji et al., "Super-resolution imaging with an achromatic multi-level diffractive microlens array," Optical Society of America, Sep. 2020, 7 pages, Optical Society of America, Washington D.C., DOI: https://doi.org/10.1364/OL.410013.

Majumder et al., "Versatile Diffractive Flat Optics," Optics and Photonics News, Dec. 2020, 2 pages, Optics and Photonics News, Washington D.C., DOI: 10.1364/OPN.31.12.000043.

Meem et al., "Multi-plane, Multi-band image projection via Broadband Diffractive Optics," Applied Optics, 2020, vol. 59, Issue I, pp. 38-44 (2020), 22 pages, Washington D.C., doi.org/10.1364/AO.59.000038.

Meem et al., "Free-form broadband flat lenses for visible imaging," OSA Continuum, Jan. 2021, 7 pages, vol. 4, No. 2, OSA Continuum, Washington D.C., doi.org/10.1364/OSAC.418378.

Mohammad, "Multilevel Diffractive Optics for Broadband Applications," A dissertation submitted to the faculty of The University of Utah, Dec. 2017, 184 pages, Salt Lake City, UT.

Mohammad et al., "Broadband imaging with one planar diffractive lens," Springer Nature, Feb. 12, 2018, 7 pages, Berlin, Germany.

* cited by examiner

BROADBAND DIFFRACTIVE OPTICAL ELEMENT

RELATED APPLICATION

This application claims priority to U.S. Provisional Application No. 63/059,335 filed on Jul. 31, 2020, which is incorporated herein by reference.

GOVERNMENT INTEREST

This invention was made with government support under grant No. N66001-10-1-4065 awarded by the Office of Naval Research. The government has certain rights in the invention.

BACKGROUND

Diffractive optic elements (DOE) are typically thin phase elements that operate by means of interference and diffraction to produce arbitrary distributions of light. Diffractive optics sculpt the propagation of light to generate complex intensity and phase patterns downstream by imposing a phase and/or intensity pattern on the incident light. DOEs utilize a microstructure surface relief profile for their optical function. Light transmitted by a DOE can be reshaped to almost any desired distribution via diffraction and subsequent propagation. DOEs can be used in imaging applications. For example, imaging over the visible band can be performed using a DOE as a lens designed to focus over a broad wavelength range.

In optics, the f-number of an optical system, such as a camera lens, is the ratio of the optical system's focal length to the diameter of the entrance pupil ("clear aperture"). As such, the f-number of a lens is a measure of the lens' light gathering power, which directly controls the image brightness. Disregarding differences in light transmission efficiency, a lens with a greater f-number projects darker images. The brightness of the projected image (illuminance) relative to the brightness of the scene in the lens's field of view (luminance) decreases with the square of the f-number. The f-number is the reciprocal of the relative aperture (the aperture diameter divided by focal length). The f-number can be adjusted by tuning the entrance pupil diameter, such that decreasing the f-number will increase the area of the aperture, effectively increasing the light throughput. However, varying the f-number alters the numerical aperture (NA) of the lens as well, which in turn affects the depth of field (DOF) and resolution of the lens.

SUMMARY

Broadband diffractive optical elements, as well as imaging systems, imaging devices, and methods for designing broadband diffractive optical elements are described which allow for at least partial decoupling of f-number from NA.

A broadband diffractive optical element is described in accordance with an example of the present technology. The broadband diffractive optical element has a substrate and an array of optical cells, which can be formed on the substrate to have a non-linear arrangement of cell heights to diffract light into a focal spot. The size and shape (geometry) of the focal spot can be designed to decouple the f-number from the numerical aperture for an imaging device or system that employs the broadband diffractive optical element as a lens.

A method of designing a broadband diffractive optical element is provided in accordance with an example of the present technology. The method can include selecting a size and shape (geometry) of a focal spot that decouples the f-number from the numerical aperture for an imaging device or system that employs the broadband diffractive optical element as a lens. The method can also include identifying a non-linear arrangement of cell heights that diffract light into the focal spot. For example, a nonlinear optimization technique can be performed to identify cell heights that produce a diffraction efficiency that is more efficient as compared to diffraction efficiencies of other cell heights based on the focal spot, and the cell heights can be used for the non-linear arrangement of cell heights which diffract light into the focal spot.

An imaging device that includes a broadband diffractive optical element is also described in accordance with an example of the present technology. The imaging device can include the broadband diffractive optical element, which comprises an array of optical cells formed on a substrate to have a non-linear arrangement of cell heights which diffract light into a focal spot, which has been designed to have a size and shape (geometry) to decouple the f-number from the numerical aperture for the imaging device. The imaging device can also include an image sensor configured to detect light diffracted by the broadband diffractive optical element into the focal spot, and a memory module having stored instructions that, when executed by a processor, generate an image based on the light detected by the image sensor.

There has thus been outlined, rather broadly, the more important features of the invention so that the detailed description thereof that follows may be better understood, and so that the present contribution to the art may be better appreciated. Other features of the present invention will become clearer from the following detailed description of the invention, taken with the accompanying drawings and claims, or may be learned by the practice of the invention.

Figure 1:
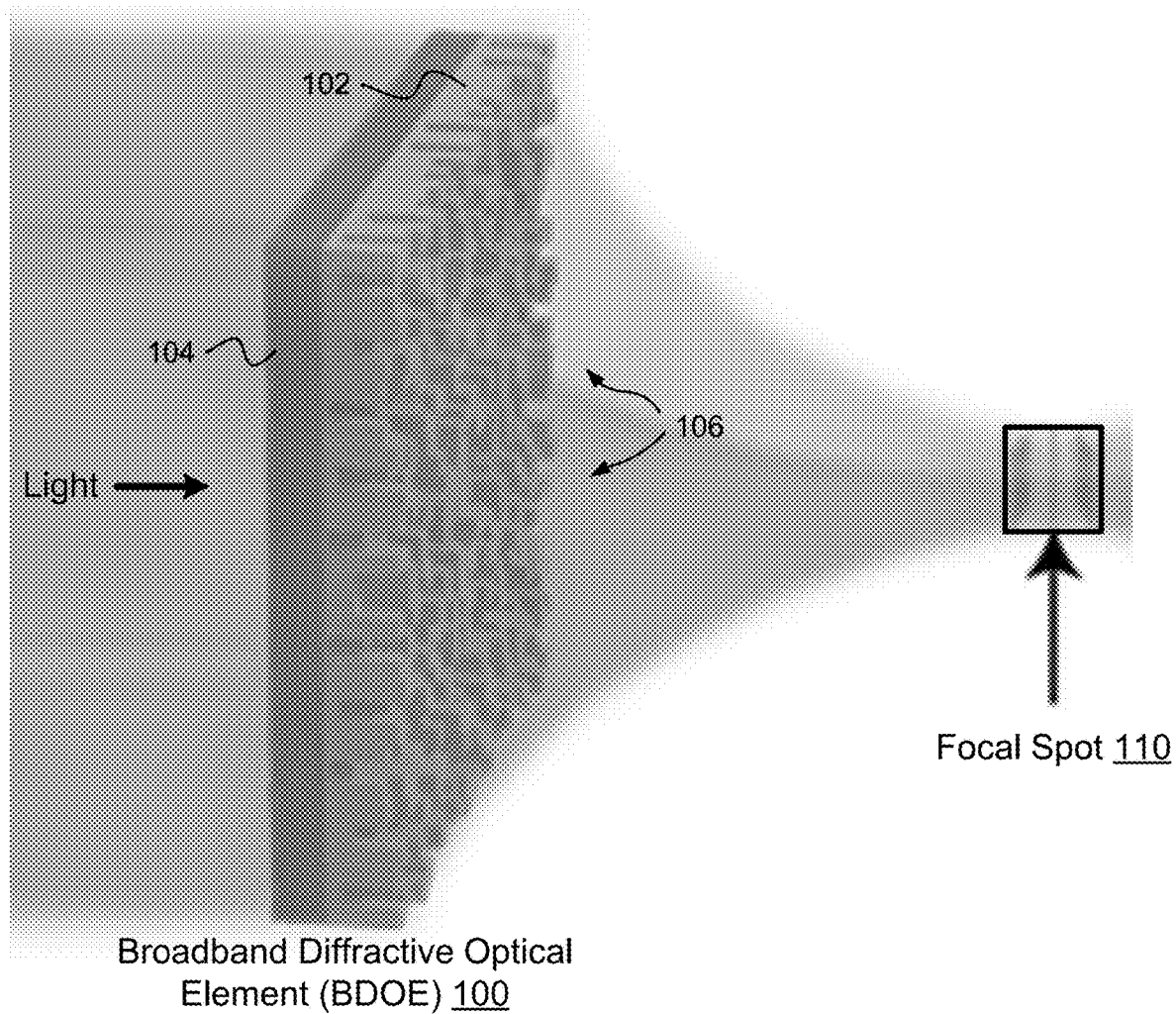
FIG. 1 is a diagram illustrating a broadband diffractive optical element, in accordance with one example of the present technology.

These drawings are provided to illustrate various aspects of the invention and are not intended to be limiting of the scope in terms of dimensions, materials, configurations, arrangements or proportions unless otherwise limited by the claims.

DETAILED DESCRIPTION

While these exemplary embodiments are described in sufficient detail to enable those skilled in the art to practice the invention, it should be understood that other embodiments may be realized and that various changes to the invention may be made without departing from the spirit and scope of the present invention. Thus, the following more detailed description of the embodiments of the present invention is not intended to limit the scope of the invention, as claimed, but is presented for purposes of illustration only and not limitation to describe the features and characteristics of the present invention, to set forth the best mode of operation of the invention, and to sufficiently enable one skilled in the art to practice the invention. Accordingly, the scope of the present invention is to be defined solely by the appended claims.

Definitions

In describing and claiming the present invention, the following terminology will be used.

The singular forms "a," "an," and "the" include plural referents unless the context clearly dictates otherwise. Thus, for example, reference to "a lens" includes reference to one or more of such structures and reference to "the sensor" refers to one or more of such features.

As used herein with respect to an identified property or circumstance, "substantially" refers to a degree of deviation that is sufficiently small so as to not measurably detract from the identified property or circumstance. The exact degree of deviation allowable may in some cases depend on the specific context.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

As used herein, the term "about" is used to provide flexibility and imprecision associated with a given term, metric or value. The degree of flexibility for a particular variable can be readily determined by one skilled in the art. However, unless otherwise enunciated, the term "about" generally connotes flexibility of less than 2%, and most often less than 1%, and in some cases less than 0.01%.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

As used herein, the term "at least one of" is intended to be synonymous with "one or more of." For example, "at least one of A, B and C" explicitly includes only A, only B, only C, or combinations of each.

Numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a numerical range of about 1 to about 4.5 should be interpreted to include not only the explicitly recited limits of 1 to about 4.5, but also to include individual numerals such as 2, 3, 4, and sub-ranges such as 1 to 3, 2 to 4, etc. The same principle applies to ranges reciting only one numerical value, such as "less than about 4.5," which should be interpreted to include all of the above-recited values and ranges. Further, such an interpretation should apply regardless of the breadth of the range or the characteristic being described.

Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function are expressly recited in the description herein. Accordingly, the scope of the invention should be determined solely by the appended claims and their legal equivalents, rather than by the descriptions and examples given herein.

Broadband Diffractive Optical Elements and Systems

Reference will now be made to the examples illustrated, and specific language will be used herein to describe the same. It will nevertheless be understood that no limitation of the scope of the technology is thereby intended. Additional features and advantages of the technology will be apparent from the detailed description which follows, taken in conjunction with the accompanying drawings, which together illustrate, by way of example, features of the technology.

With the general examples set forth in the Summary above, it is noted in the present disclosure that when describing the devices, systems, and methods, individual or separate descriptions are considered applicable to one other, whether or not explicitly discussed in the context of a particular example or embodiment. For example, in discussing the broadband diffractive optical element per se, the device, system, and/or method embodiments are also included in such discussions, and vice versa.

Furthermore, various modifications and combinations can be derived from the present disclosure and illustrations, and as such, the associated figures should not be considered limiting.

Broadband diffractive optical elements (BDOEs), as well as devices and systems that utilize BDOEs, and methods for designing such BDOEs are described herein. More specifically, high efficiency BDOEs that can operate over a large wavelength range and decouple the f-number from the numerical aperture, as well as the design and use of the same, are described. However, these examples are intended to be non-limiting and the present technology may be used in virtually any application in which a broadband diffractive optic is desired.

To further describe the present technology, examples are now provided with reference to the figures. FIG. 1 is a diagram illustrating an example of a BDOE 100 that, when utilized as a lens, decouples the f-number from the numerical aperture for an imaging device or system. The BDOE 100 can include a substrate 102 comprising a transparent material such as a photoresist, polymethylmethacrylate (PMMA), or other polymer that is transparent to the wavelengths of interest. The substrate 102 can also be glass, fused silica, fused quartz, silica, quarts, or any material that can provide a rigid support and also be transparent at the wavelengths of interest. In one example, a glass substrate 104 (e.g., soda-lime glass) can be placed on a light collection side of the BDOE 100 to provide support for the substrate 102. Illustratively, the substrate 102 can have a thickness between 100 µm to 5 mm, and the glass substrate 104 can have a thickness between 0.5 mm to 2 mm. However, as will be appreciated, the substrate 102 and glass substrate 104 can be fabricated to have any appropriate thicknesses.

An array of optical cells 106 can be formed on the substrate 102. In one example, laser write gray-scale lithography can be used to form and pattern the optical cells 106 from the substrate 102. In another example, the optical cells 106 can be formed on the surface of the substrate 102 by additively manufacturing (e.g., three-dimensional 3D printing) the optical cells 106 on the substrate 102. In one example, the array of optical cells 106 can be square shaped pixels. In other examples, the optical cells 106 can be a rectangle shape, a circle shape, a ring (in the case of radially symmetric designs), or any other shape that can tile a two-dimensional (2D) surface. The array of optical cells 106 and each optical cell within the array can be transmissive to light at imaging wavelengths (e.g., 450 nm-750 nm), and the array of optical cells 106 can be a static structure.

A width of an optical cell 106 may be determined by a fabrication technology used to manufacture the BDOE 100. Illustratively, an optical cell 106 may have a width from 0.1 µm to 10 µm, and most often 0.5 µm to 2 µm. The array of optical cells 106 has a non-linear arrangement of cell heights that form a distributed cell height pattern designed to diffract light into a focal spot 110. The non-linear arrangement of cell heights can vary over at least three defined cell heights, and in many cases can include four to twelve defined cell heights. It will be appreciated that there is no theoretical limit to the number of cell heights that can be included in the array of optical cells 106. Illustratively, the cell heights can range from 0 to 2.6 µm. As described later in association with FIG. 2, the non-linear arrangement of cell heights can be determined using a nonlinear optimization technique, which can be configured to maximize diffraction efficiency based on a target focal spot, which is also called the point-spread function (PSF).

The focal spot 110 can be designed to effectively decouple the f-number from the numerical aperture for an imaging device or system that employs the BDOE 100 as a lens. More specifically, the non-linear arrangement of cell heights of the optical cells 106 can be designed to diffract light into the focal spot 110, such that the f-number and the numerical aperture can be independently selected. The f-number of a lens is a measure of lens' light gathering power, which directly controls the brightness of an image. The f-number is defined as the ratio of the focal length (f) of the lens to the entrance pupil diameter (D). The f-number can be adjusted by tuning the entrance pupil diameter, such that decreasing the f-number will increase the area of the aperture and effectively increase the light throughput or light-collection ability of the lens. However, for spherical lens' varying the f-number alters the numerical aperture of the lens, which in turn affects the depth of field resolution. The numerical aperture of a spherical lens is defined as the multiplication of the refractive index (n) of the medium in which light propagates and sine of the half of the maximum angle (2θ) with which the light is focused into the focal spot. For a spherical lens operating in air (n=1), numerical aperture can be written as:

$$NA = \sin\theta = \sin\left[\tan^{-1}\left(\frac{D}{2\times f}\right)\right] \approx \frac{D}{2\times f} = \frac{1}{2\times (f/\#)} \quad 1)$$

where the approximation is valid for small numerical aperture. The relationship between the f-number and the numerical aperture poses a unique challenge for having both a large light collection ability and a large focal spot, which for example, can be advantageous when a pixel size of an image sensor is much larger than a diffraction limit, and using a larger f-number lens can improve the image contrast.

The numerical aperture of a lens is a measure of how tightly the light is focused. The smallest extent of the focused spot, which is also referred to as the point-spread function (PSF) is limited by diffraction as:

$$NA_{eff} = \frac{\lambda}{2\times S} \quad 2)$$

where S is the full-width at half-maximum (FWHM) of the PSF at wavelength, λ. The focal spot can, in fact, be larger than this limit (up to the aperture size of the lens itself). So, by engineering the size and shape (geometry) of the focal spot, the f-number can be effectively decoupled from the numerical aperture. This can be achieved readily by engineering the complex transmittance of the lens, also referred to as the lens pupil function. Engineering the pupil function has enabled super-resolution microscopy and lithography, extended depth of field, and achromaticity across large bandwidths. Modulation of the pupil function can be accomplished using DOEs.

In this manner, f-number and numerical aperture can be decoupled by independent controlling the design parameters. As outlined herein, the f-number is determined by the focal length and the diameter such that choice of these two parameters fixes f-number for a given location of a focal plane with respect to the DOE. The NA, on the other hand is related to the spatial frequency content of the PSF. Specifically, NA is proportional to the size of the intensity distribution in the vicinity of the focus (e.g. a volume). The larger the NA, the smaller the size. In 2D (i.e. in the focal plane), the NA~0.5*lambda/(FWHM), where FWHM is the full-width at half-maximum of the focal spot. Specifying a focal intensity distribution (in 2D or in 3D) is different than a standard focal spot, and is herein referred to as focal shape. In one example, a square spot can be used. Regardless, a constraint is placed by specifying a desired intensity distribution at the focus (i.e. shape of a focal volume along the focal plane) and designing the lens to try to match it as best as possible, e.g. using an iterative perturbation algorithm as described herein.

DOEs have the advantages of large space-bandwidth products, large range in phase, very low-loss, efficient broadband operation, and the potential to handle high power. The BDOE 100 shown in FIG. 1 can be designed to decouple the f-number and the numerical aperture. As a non-limiting example, a BDOE can be fabricated to have a diameter of about 4 mm, and a focal length of about 45 mm, and to operate in the visible spectrum of 450 nm to 750 nm. Based on these dimensions, the BDOE yields the f-number of 11.25 mm. By engineering the geometry of the focal spot 110 to be one of: 400 µm, 45 µm or 5.6 µm, the numerical aperture of 0.00075, 0.0067, or 0.054, respectively, can be achieved. These three BDOEs can be used as "free-form" flat lenses operating in the visible spectrum. The meaning of "free-form" can be twofold. First, the BDOE lens is free to attain any size and shape within the design space (e.g., 4 mm×4 mm×2.6 mm), and second, the focal spot can also be of any size and shape as well.

In one example, multiple BDOEs 100 can be tiled together to create a larger lens to capture an entire image, where each BDOE 100 in the lens is positioned to transmit light to a different focal point in an array of focal points of an image sensor used to generate the image. In another example, a single BDOE 100 can be configured to capture an entire image where regions of optical cell arrays are designed to individually focus light on different focal points of an image sensor used to generate the image.

Figure 2:
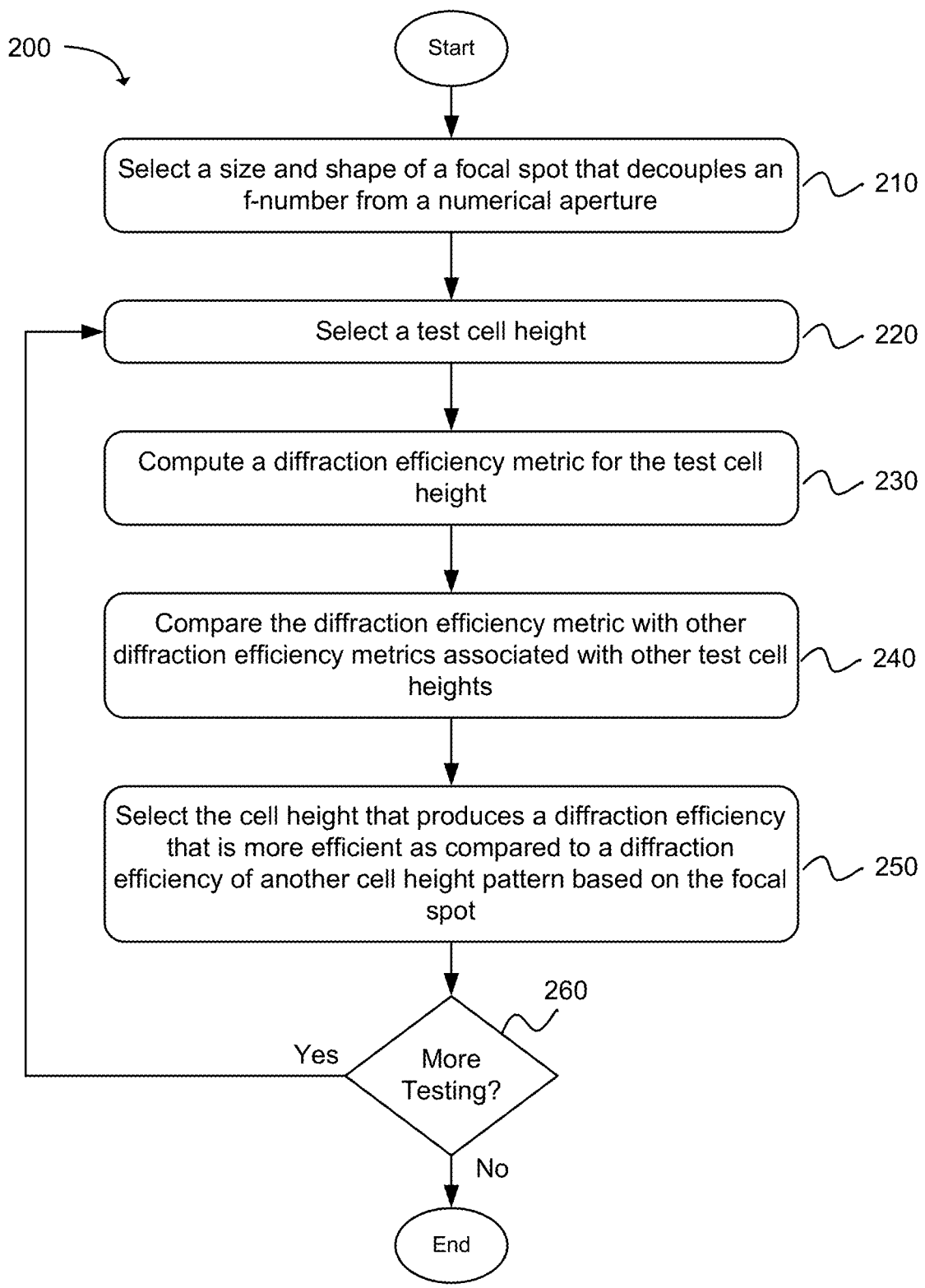
FIG. 2 is a flow diagram that illustrates a method of designing a broadband diffractive optical element, in accordance with one example of the present technology.

FIG. 2 is a flow diagram that illustrates an example method 200 for designing a BDOE. Through careful design, a lens with a focal spot of arbitrary size and shape, independent of the f-number and numerical aperture, can be realized. Realizing a focal spot with relatively well-defined size, shape, and intensity distribution has potential applications in microscopy, lithography, and additive manufacturing. Moreover, by treating the phase at the focal spot to be a free parameter, it may be possible to achieve extreme depth of focus and achromaticity across large bandwidths.

As in block 210, a focal spot size and shape that decouples the f-number from the numerical aperture can be selected. In one example, the shape of the focal spot can be one of: Gaussian, doughnut-shaped, Lorentzian, Top-hat, Bessel shape, elliptical, and the like. After selecting the dimensions of the focal spot, the cell heights of the BDOE can be determined. More specifically, a non-linear arrangement of cell heights which diffract light into the focal spot can be identified using a nonlinear optimization technique. In one example, the nonlinear optimization technique can include the steps shown in blocks 220-260.

Specifically, as in block 220, a test cell height can be selected. For example, an initial test cell height can be selected and the initial test cell height can be replaced by a subsequent test cell height when the subsequent test cell height results in a more efficient diffraction than that of the initial test cell height. The test cell height can be selected from an array of optical cells on the substrate of the BDOE. The array of optical cells can include any desired number of cells. For example, the array may comprise a matrix of 1,000×1,000 cells, 25,000×25,000 cells, etc. The size of the array can vary depending on the application and can vary from hundreds across to tens of thousands across, or more. Each cell can comprise an area on the substrate of a few nanometers to tens of nanometers. The cells can also be larger or smaller and may be limited simply by the manufacturing method used. The test cell can be selected randomly from the array of optical cells, or alternately can be selected from the array of optical cells according to a predetermined selection pattern.

After selecting a test cell height, a diffraction efficiency metric can be computed for the test cell height, as in block 230. In one example, the diffraction efficiency metric can be computed by first computing images at a plurality of discrete wavelengths using diffraction-based propagation through the array of optical cells. This propagation can be done assuming a continuous spectrum. In other words, this method is not restricted to discrete wavelengths. The mathematics may be different for a continuous spectrum as compared with discrete wavelengths, but the method is still the same. In the continuous spectrum case, properties of the source can be taken into consideration, such as spatial and temporal coherence. The substrate can be fabricated and tested for each cell change, but this may be cost-prohibitive. As a result, a computer, or grid of computers can be used to compute propagation of light or images through the array of optical cells. In one example, the images propagated through the array of optical cells can include one or more specific wavelengths of light, or ranges of wavelengths, or sets of discrete wavelengths. Use of multiple images can be useful in testing various metrics related to the propagation of light through the array of optical cells.

A wavelength metric can be determined for each of the images propagated through the array of optical cells. Although spectral efficiency is one useful metric, other metrics can be used alone or in combination with spectral efficiency, such as, but not limited to, image quality, spatial coherence, temporal coherence, and the like. These metrics can optionally be weighted when used in combination.

The wavelength metric for each image can be consolidated into a diffraction efficiency metric. The diffraction efficiency metric may be a performance metric which can be altered due to the change in height of one or more of the cells, where the performance metric being changed may be a result of the change in height from an original or previous performance metric to a diffraction efficiency metric. Also, the diffraction efficiency metric can be calculated across the wavelengths of interest. Namely, the diffraction efficiency calculation may be wavelength dependent, and the resulting diffraction efficiency can be summed across each of the cells in the cell array.

As in block 240, the diffraction efficiency metric can be compared to previously computed diffraction efficiency metrics associated with other test cell heights, and as in block 250, the cell height associated with the diffraction efficiency metric that is an improvement over the previous diffraction efficiency metrics for other cell heights can be selected. The method 200 can further include assigning an initial diffraction efficiency metric the value of a diffraction efficiency metric when the diffraction efficiency metric is an improvement over the initial performance metric. The method can further include discarding a diffraction efficiency metric when the diffraction efficiency metric is not an improvement over the initial diffraction efficiency metric. The method can also further include repeating the method 200 for each cell in the array at least once. Alternatively, the steps of the method 200 can be repeated for only a portion of the cells in the array (e.g., at least 80% or more). In general, enough cells can be optimized to provide for a desired increase or level of optimization of the configuration.

As in block 260, in the case that there are more cell heights to test, the method 200 may select a next test cell height. The height of the test cell can be changed by a predetermined height unit. The height unit can be any desired height. For example, a cell height can be increased or decreased by one nanometer, or by ten nanometers, or any other desired increment. Although increments can be varied, as a general guideline the increment can be from about 2-50 nm and in some specific cases may be less than 5 nm. However, increment values larger than 50 nm can be suitable for some applications. Choice of this value can be a function of equipment resolution limitations and design specifications (e.g., a higher target efficiency can benefit from smaller increments). Further, the method 200 can be adjusted to provide a variable increment adjustment from cell-to-cell or along a repeated iteration across the array. For example, a first iteration across the array could use a 30 nm increment while a second iteration could use a 10 nm increment.

Figure 3A:
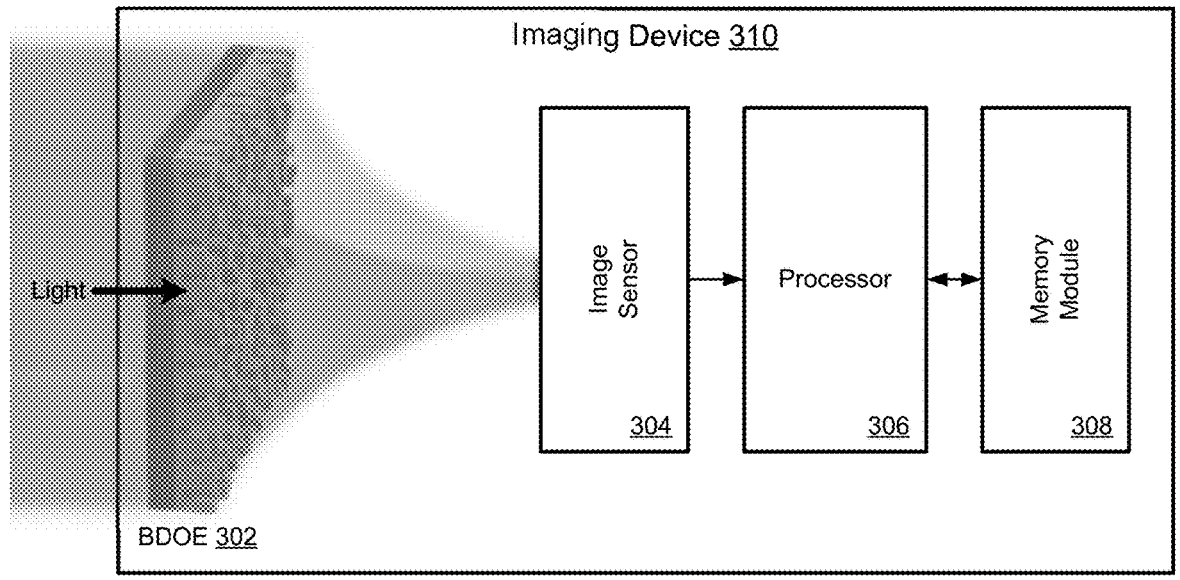
FIG. 3A is a block diagram illustrating an imaging device that includes a broadband diffractive optical element (BDOE) and has no lens other than the BDOE, in accordance with one example of the present technology.
Figure 3B:
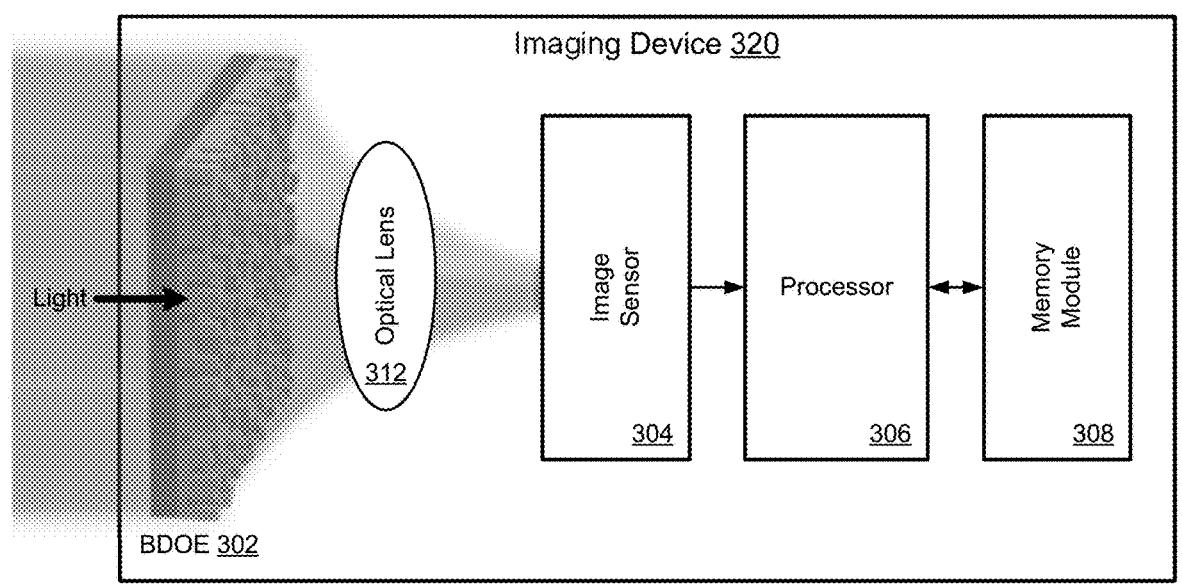
FIG. 3B is a block diagram illustrating an imaging device that includes a broadband diffractive optical element (BDOE) and an optical lens, in accordance with another example of the present technology.

FIGS. 3A-B are a block diagrams that illustrate example imaging devices 310/320 that employ a BDOE 302 as a lens. As illustrated, the imaging devices 310/320 can include a BDOE 302 that acts as a lens, an image sensor 304, a processor 306, and a memory module 308. The imaging devices 310/320 can be configured to generate still images, video images, and both still images and video images. The images can be color, monochromatic, or achromatic.

The BDOE 302 includes an array of optical cells which have been formed to have a non-linear arrangement of cell heights which diffract light into a focal spot, as described earlier. The geometry of the focal spot can effectively decouple the f-number from a numerical aperture for the imaging devices 310/320. A depth of focus for the imaging devices 310/320 using the BDOE 302 as a lens can be 0.1 mm to 100s of mm such as 400 mm. The depth of focus is primarily limited by diffraction such that when the depth of focus is increased, generally the focal spot size also increases. In other words, there is a trade-off between the depth of focus and the focusing efficiency.

In the example illustrated in FIG. 3A, the imaging device 310 has no lens other than the BDOE 302. However, the example illustrated in FIG. 3B, the imaging device 300 can include an optical lens 312 in addition to the BDOE 302. The optical lens 312 can be positioned in the imaging device 300 to allow light to pass through the optical lens 312 before being received by the image sensor 304. Although FIG. 3B shows the optical lens 312 as being located between the BDOE 302 and the image sensor 304, in some examples the optical lens 312 can be placed in front of the BDOE 302, such that the BDOE 302 is located between the optical lens 312 and the image sensor 304. By using a refractive lens one can share the optical power between the hologram and the lens. This orientation can simplify and reduce the functional requirements on the hologram. Whether the refractive lens is in front of or behind the hologram will impact aberrations of the final image. Therefore, a location and orientation of the refractive lens can be considered in the design procedure and constraints.

The image sensor 304 can be a complementary metal-oxide-semiconductor (CMOS) sensor, a charge-coupled device (CCD) sensor, or another appropriate image sensor. In one example, the BDOE 302 acting as a lens can comprise a single BDOE 302 configured to capture an entire image using defined regions of optical cell arrays which are designed to individually focus light on different focal points of the image sensor 304. In another example, a plurality of BDOEs 302 can be tiled together to act as a lens and capture an entire image. Each BDOE 302 in the lens can be configured to transmit light to a different focal point on the image sensor 304. The image sensor 304 can detect and convert the variable attenuation of light waves into signals that convey the light information and send the signals to the processor 306. The memory module 308 includes instructions that, when executed by the processor 306, generate an imaged based on the light detected by the image sensor 304.

In one example, the processor 306 can be a specialized digital image processor configured to perform post processing of raw image data received from the image sensor 304. For example, the memory module 308 can contain post processing instructions that can be executed by the processor 306 to perform functions which: convert raw image data to a color-corrected image in a standard image file format, fine tune raw image data, remove noise and/or unwanted features, sharpen image features, and/or other post processing functions.

Experiments and Examples

Figure 4:
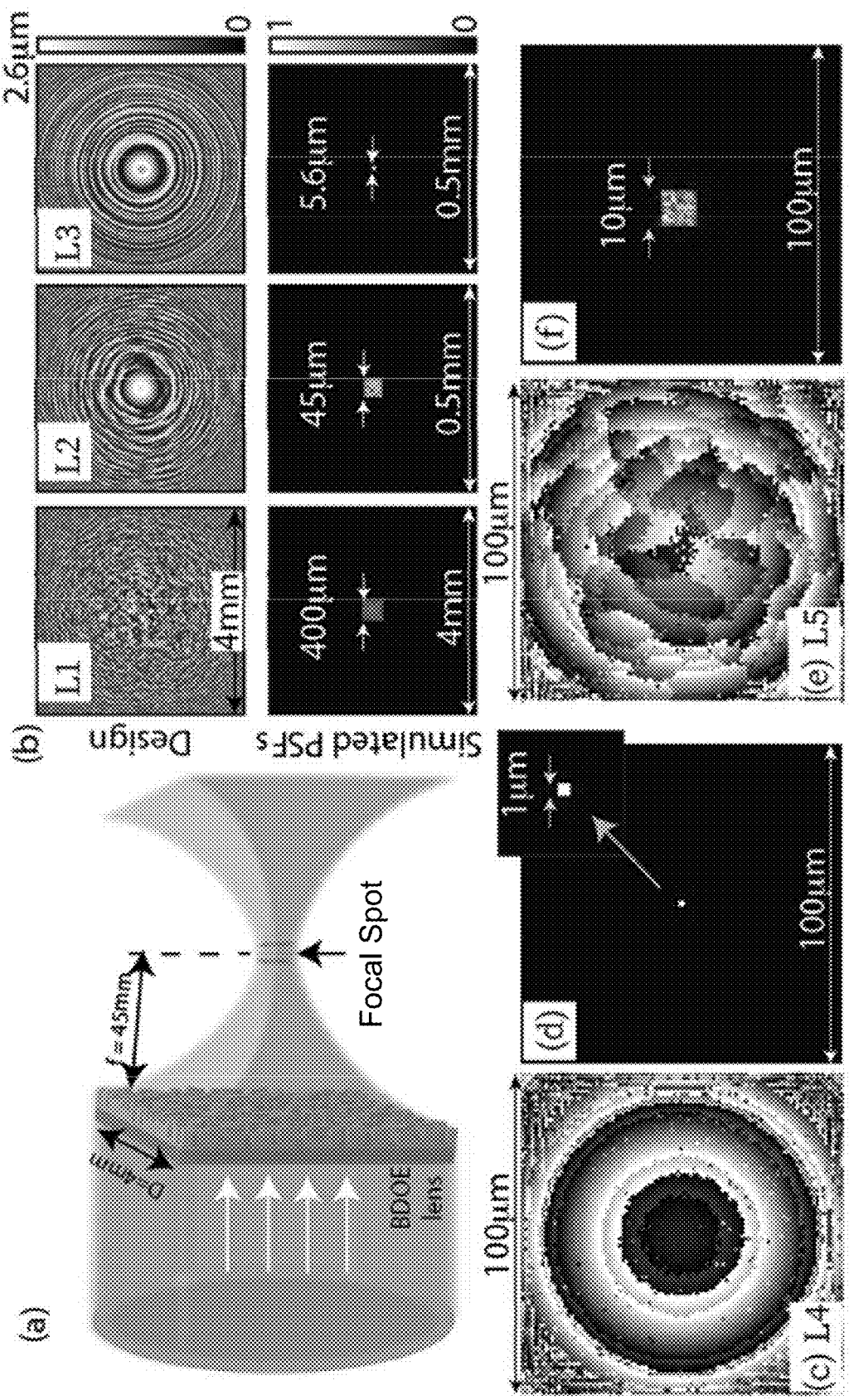
FIG. 4 illustrates a free-form broadband diffractive optical element lens with square aperture along with associated optimized pixel height distributions and simulated point-spread functions.

The concept of BDOE as a flat lens whose point spread function (PSF) is structured in the form of an image is demonstrated in FIG. 4. To avoid confusion from non-imaging devices (which have sometimes been misidentified as lenses), by a lens it is meant that the lens-makers equation is satisfied by the object and image distances, and images can be formed. FIG. 4(a) illustrates a free-form BDOE flat lens with a square aperture, having a 4 mm diameter and a focal length of 45 mm. The BDOE is comprised of square pixels, whose minimum width is determined by the fabrication technology, and whose heights are determined via a nonlinear optimization procedure, such as is described earlier. The goal of the optimization is to maximize the diffraction efficiency based on the target image, averaged over all the wavelengths of interest. Here, the target image is a focal spot, whose geometry and size are selected independently of the f-number of the lens. Specifically, three BDOE lenses were designed and fabricated to focus light into a spot size of 400 µm (L1), 45 µm (L2) and 5.6 µm (L3) respectively as illustrated in FIG. 4(b). For simplicity, the pixel size was constrained to 5 µm with 100 possible height levels between 0 and 2.6 µm. Assuming an average wavelength of 600 nm and designed spot sizes of 400 µm, 45 µm, 5.6 µm, the effective numerical aperture of the BDOE lenses were 0.00075, 0.0067 and 0.054, respectively. The optimized height profiles along with the simulated point-spread functions of the BDOE lenses are shown in FIG. 4(b).

For ease of fabrication, the experiments were limited to low effective numerical aperture. However, this is not a fundamental limitation as illustrated by two flat lens designs showcased in FIG. 4(c-f) with f-number=2.5, but natural aperture of 0.3 (L4) and 0.03 (L5). The design parameters were the same as in L1-L3, except pixel width was 1 µm, the number of pixels was 100×100 (lens aperture size=100 µm), and focal length=250 µm. Clearly, engineering the focal spot size, and thereby decoupling f-number and numerical aperture is possible at higher effective numerical aperture as well.

Figure 5:
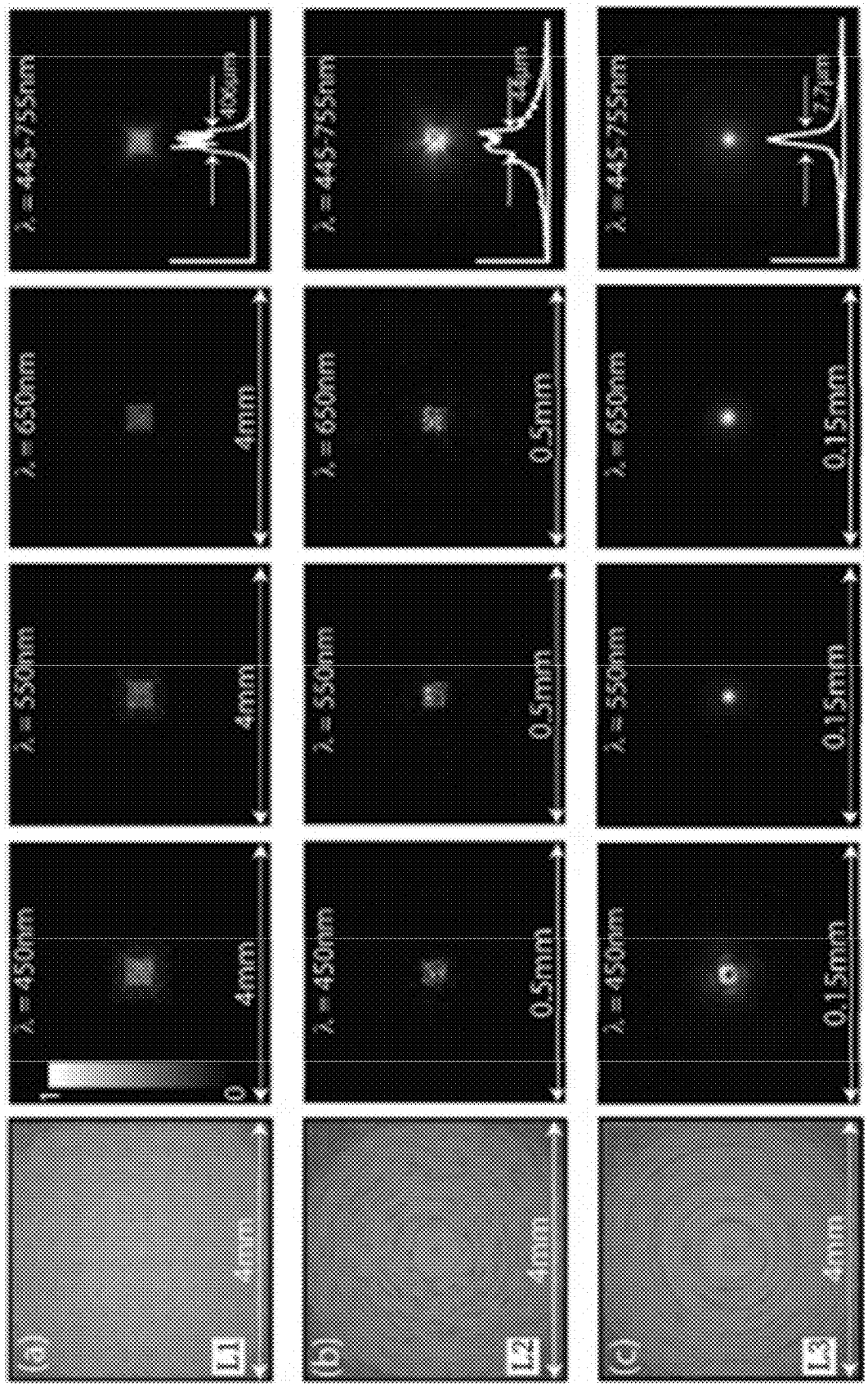
FIG. 5 shows experimental verification of broadband focusing for a set of broadband diffractive optical element lenses.

The BDOEs were fabricated by patterning a positive-tone, transparent photopolymer film (S1813, Microchem), which was spun-cast to a thickness of 2.6 µm on top of a soda-lime-glass substrate (thickness☐0.5 mm, diameter=50 mm). Laser gray-scale lithography was used for patterning. Optical micrographs of the fabricated devices are shown in FIG. 5, wherein experimental verification of broadband focusing of (a) L1, (b) L2 and (c) L3 lenses as shown. As shown from left to right: optical micrographs of the fabricated lenses, measured PSFs for the narrowband (450 nm, 550 nm, 650 nm), and broadband illuminations (455-755 nm) along with the cross section. The illumination bandwidth was 15 nm for the narrowband experiments.

Figure 6:
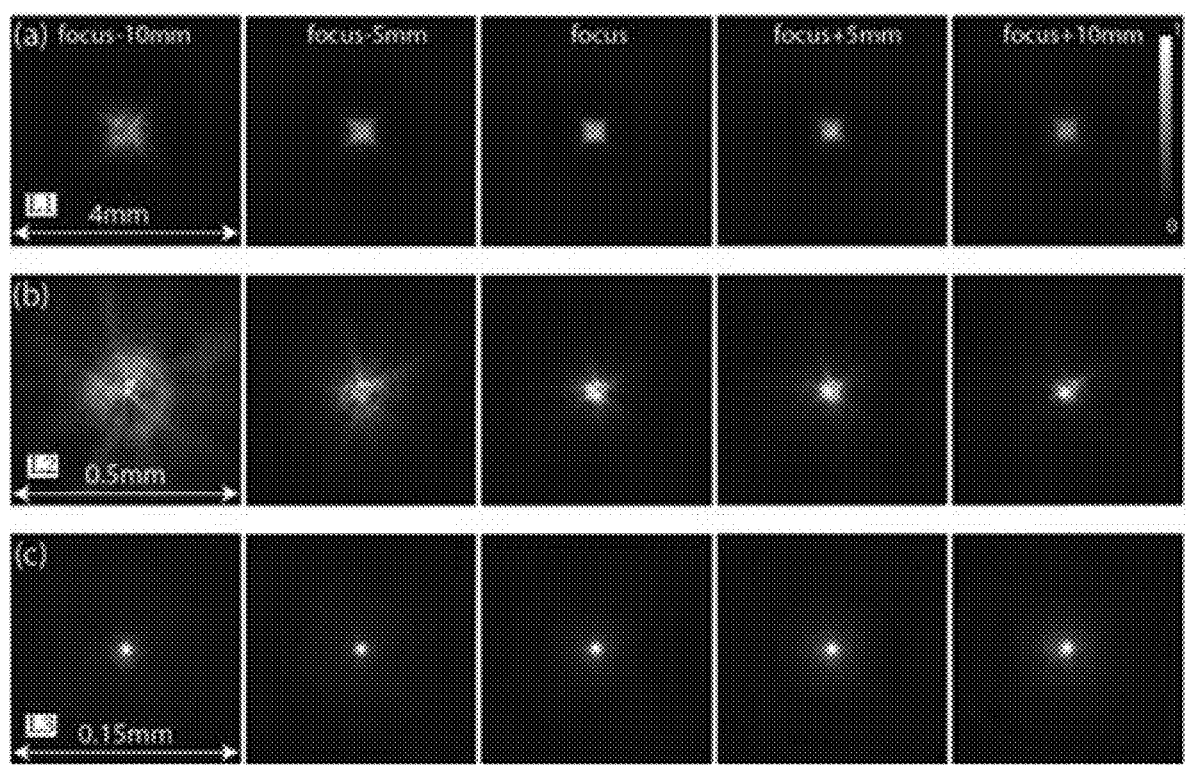
FIG. 6 shows measured point-spread functions as a function of defocus for the set of broadband diffractive optical element lenses.

The focusing performance of each flat BDOE lens was characterized by recording the point-spread function (PSF) under broadband and narrowband wavelengths. Each BDOE lens was illuminated by an expanded and collimated beam from a super-continuum source (SuperK EXTREME EW-6, NKT Photonics) coupled to a tunable filter (SuperK VARIA, NKT photonics). The PSF was recorded directly on a monochrome CMOS image sensor (DMM 27UP031-ML, The Imaging Source). The captured PSFs under narrowband primary colors (red, green, blue) illumination and broadband white light illumination are shown in FIG. 4. Achromatic focusing with spot size close to that predicted by simulation is observed, although some of the discrepancies can be attributed to fabrication errors. For characterizing the depth of focus (DOF), the image sensor was placed on a stage and captured the PSFs at different distances under broadband illumination (455-755 nm). The results are illustrated in FIG. 6, which shows measured PSFs as function of defocus for (a) L1, (b) L2, and (c) L3 lenses. The sensor was placed behind the lens and moved to capture the focal spot at different distances to estimate the DOF. Note the focus was located at 45 mm. The experiments confirm a DOF of □20 mm for L3, which is almost 200 times larger than that was expected from diffraction.

Figure 7:
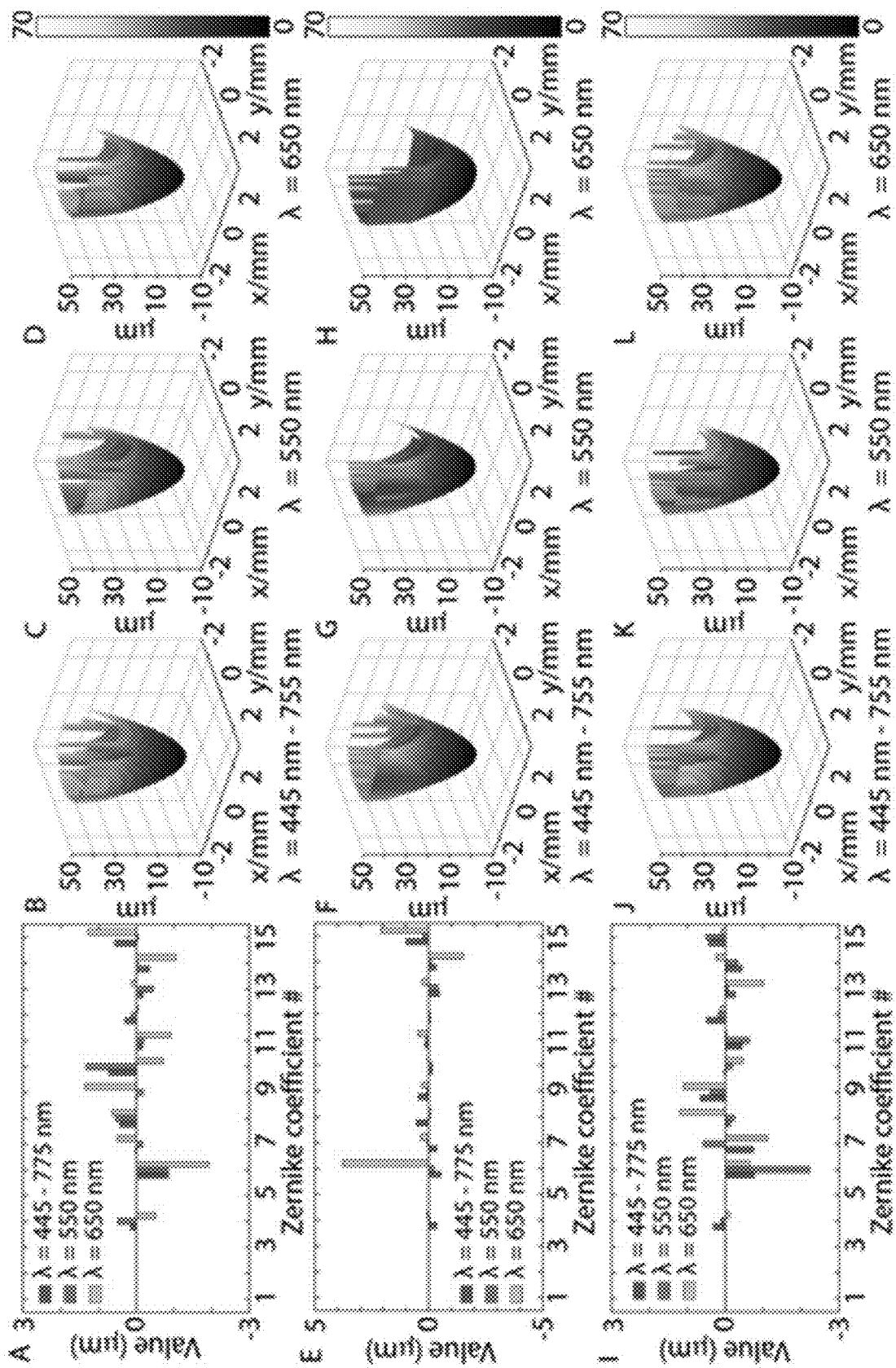
FIG. 7 shows Zernike polynomial coefficients and measured wave fronts for the set of broadband diffractive optical element lenses.

A Shack-Hartmann wavefront sensor (Thorlabs, WFS 150-7AR) was used to measure the wavefront aberrations of the fabricated lenses. Each lens was positioned such that the wave front incident on the WFS was converging. The wave front aberrations were measured under broadband illumination (445-755 nm) and under narrowband illuminations centered at 450 nm, 550 nm, 650 nm and 750 nm with 15 nm bandwidth. The corresponding Zernike polynomial coefficients are shown in FIG. 7(a-c) for L1-L3, respectively. The measurements confirm that the lenses exhibit low values for all aberrations. The measured wave fronts are shown in FIG. 7(d-f) (broadband) and FIG. 7(g-i) (narrowband, 550 nm) for L1-L3, respectively, although other wavelengths were also tested. The similarities between the broadband and narrowband wave fronts further confirm achromaticity of all 3 lenses. The measured normalized focal length shifts (%), $(f_{ideal}-f_{ideal})*100$ are also shown in FIG. 7(j-i) for L1-L3, respectively.

Figure 8:
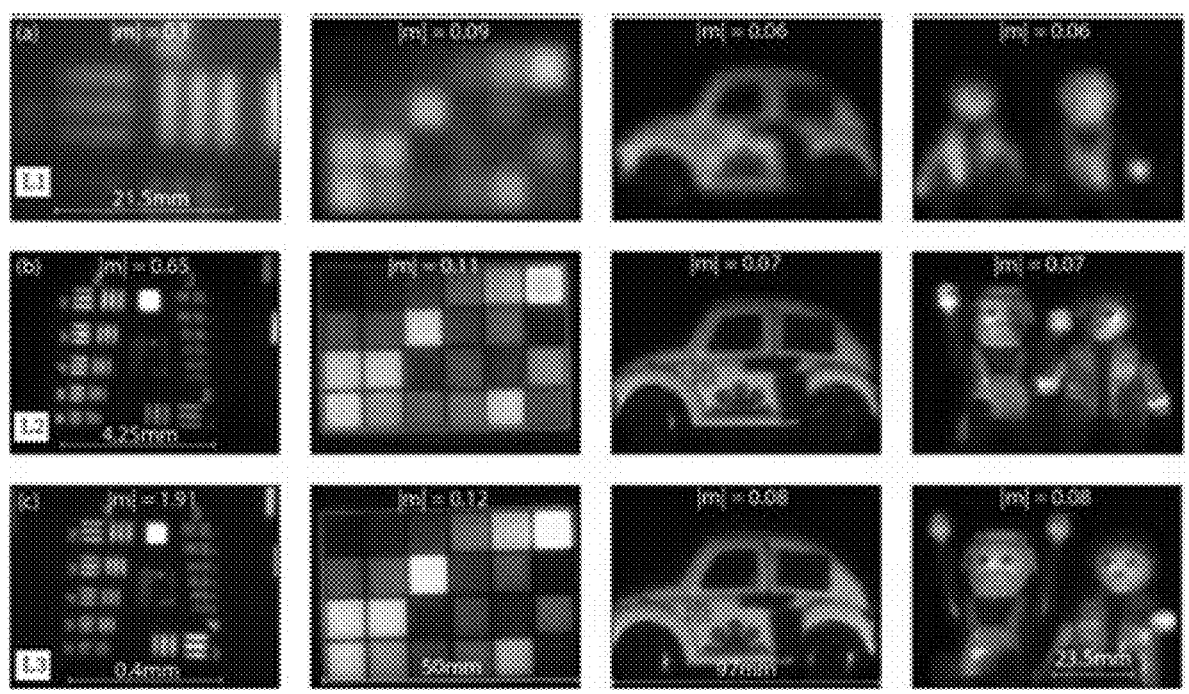
FIG. 8 is a resolution chart containing images generated by a camera using the set of broadband diffractive optical element lenses.

A camera was assembled by placing the BDOE lens in front of a color image sensor (DFM 72BUC02-ML, The Imaging Source) and recorded still and video images as summarized in FIG. 8, wherein the magnification (|m|) of each image is noted. The scale bar at the bottom represents object size. The illumination condition and exposure times were similar for all lenses, confirming that all three lens have the same f-number. The resolution chart was back illuminated by broadband (455-755 nm) white light from the super-continuum source and the color objects were illuminated by white LED light. The exposure time was adjusted to ensure that the frames were not saturated. In addition, dark frame was recorded and subtracted from each image. Note that, all the color images have similar magnification. The resolution chart reveals the smallest resolved spatial frequencies as 0.28 lp/mm, 11.30 lp/mm and 64 lp/mm, for L1, L2 and L3, respectively. Each lens produced images at the approximately the same exposure time.

Figure 9:
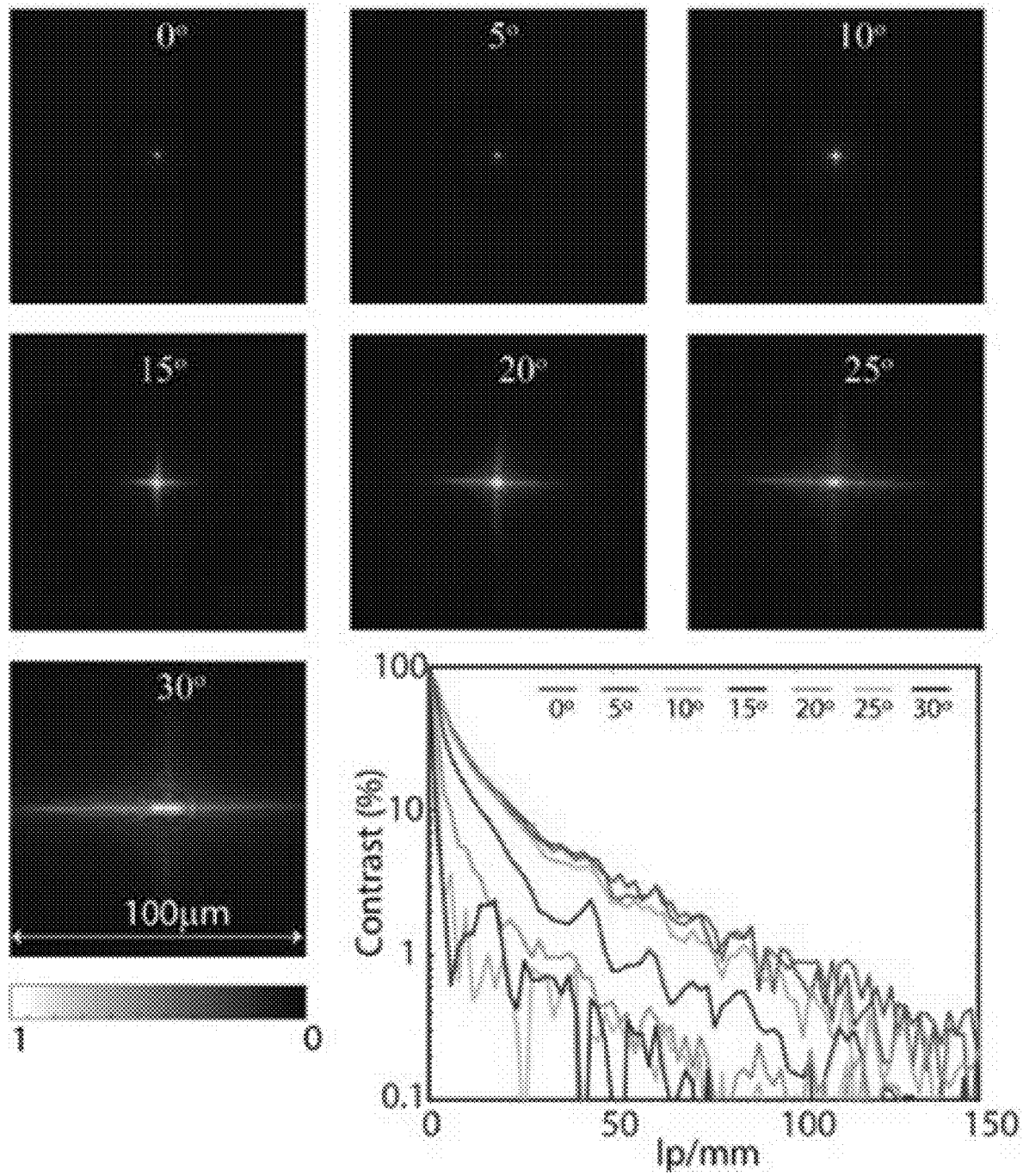
FIG. 9 shows field of view measurements for a broadband diffractive optical element lens.

As indicated in FIG. 6, L3 was expected to have an extended DOF. In order to confirm this, L3 was placed at a fixed distance from the sensor (70 mm) and the object distance was adjusted from □70 mm to 400 mm. It was confirmed that the image remains in focus over most of this range, indicating dramatic increase in depth of field across the visible band (see FIG. 8; row L3). The field of view of the lens in FIG. 8; L3 was characterized by measuring the off-axis PSFs under broadband illumination (445-755 nm). The angle of incidence of the plane wave illumination was adjusted from 0° to 30°, and the corresponding PSFs were recorded. As indicated in FIG. 9 showing the full visible band off-axis PSFs recorded for different angles of incidence, off-axis aberrations become prominent at angles>15°.

The modulation-transfer functions (MTFs) were also extracted from the measured PSF and it also confirms a full field of view of 30°.

These experimental results confirm excellent focusing and imaging performance over a broad wavelength range. Such BDOE lenses could be very useful for anti-aliasing in image sensors with large pixel sizes, where light collection efficiency needs to be maintained. Furthermore, by abandoning rotational symmetry, one can achieve free-form geometries in the focal spot, such as a square that can more closely match the geometry of the sensor pixel.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, a non-transitory machine readable storage medium, such as RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A broadband diffractive optical element, comprising:
a substrate; and
an array of optical cells formed on the substrate to have a non-linear arrangement of cell heights to diffract light into a focal spot, wherein the non-linear arrangement of cell heights vary over at least three cell heights,
wherein a size and shape of the focal spot is designed to decouple an f-number from a numerical aperture for an imaging device that employs the broadband diffractive optical element as a lens.

2. The broadband diffractive optical element of claim 1, wherein the non-linear arrangement of cell heights are determined using a nonlinear optimization technique configured to maximize diffraction efficiency based on a target point-spread function, and average the diffraction efficiency over each wavelength of interest.

3. The broadband diffractive optical element of claim 1, wherein the non-linear arrangement of cell heights vary over at least three cell heights that are between 0 and 2.6 μm.

4. The broadband diffractive optical element of claim 1, wherein the array of optical cells are square shaped pixels.

5. The broadband diffractive optical element of claim 1, wherein the shape of the focal spot is selected from one of: Gaussian, doughnut-shaped, Lorentzian, Top-hat, Bessel shape, and elliptical.

6. The broadband diffractive optical element of claim 1, wherein a wavelength of operation of the broadband diffractive optical element is between 450 nm to 750 nm.

7. The broadband diffractive optical element of claim 1, wherein the substrate has a thickness 100 μm to 5 mm.

8. The broadband diffractive optical element of claim 1, further comprising a support glass substrate located on a light collection side of the broadband diffractive optical element.

9. An imaging device, comprising:
a broadband diffractive optical element that includes an array of optical cells formed on a substrate to have a non-linear arrangement of cell heights which diffract light into a focal spot, wherein a size and shape of the focal spot is designed to decouple an f-number from a numerical aperture, wherein the non-linear arrangement of cell heights vary over at least three cell heights;
an image sensor configured to detect light diffracted by the broadband diffractive optical element into the focal spot; and
a memory module, including instructions that, when executed by a processor, generate an image based on the light detected by the image sensor.

10. The imaging device of claim 9, wherein the imaging device has no lens other than the broadband diffractive optical element.

11. The imaging device of claim 9, wherein broadband diffractive optical element further comprises a plurality of broadband diffractive optical elements that are tiled together to act as a lens to capture an image.

12. The imaging device of claim 9, further comprising an optical lens in addition to the broadband diffractive optical element, wherein the light passes through the optical lens before being received by the image sensor.

13. The imaging device of claim 9, wherein the image sensor is a complementary metal-oxide-semiconductor (CMOS) sensor.

14. The imaging device of claim 9, wherein a depth of focus for the broadband diffractive optical element is between 0.1 mm to 100 mm.

15. The imaging device of claim 9, wherein the imaging device generates still images or video images.

16. The imaging device of claim 9, wherein the imaging device generates color images.

17. A method of designing a broadband diffractive optical element, comprising:
selecting a size and shape of a focal spot that decouples an f-number from a numerical aperture for an imaging system that employs the broadband diffractive optical element as a lens; and
identifying a non-linear arrangement of cell heights for an array of optical cells that diffract light into the focal spot,
wherein a nonlinear optimization technique is performed to vary cell heights among the array of optical cells to produce a diffraction efficiency that is higher as compared to diffraction efficiencies of an initial cell height pattern based on the focal spot, wherein the non-linear arrangement of cell heights vary over at least three cell heights.

18. The method of claim 17, further comprising averaging the diffraction efficiency over wavelengths for which the broadband diffractive optical element is configured.

19. The method of claim 17, wherein the nonlinear optimization technique comprises:
   selecting a test cell height;
   computing a diffraction efficiency metric for the test cell height; and
   determining whether the diffraction efficiency metric is an improvement over a diffraction efficiency metric associated with the initial cell height pattern.

20. The method of claim 17, wherein the non-linear arrangement of cell heights vary over at least three cell heights between 0 and 2.6 µm.

21. The broadband diffractive optical element of claim 1, wherein the non-linear arrangement of cell heights vary over four to twelve cell heights.

* * * * *